(12) United States Patent
Boutell et al.

(10) Patent No.: US 8,780,205 B2
(45) Date of Patent: Jul. 15, 2014

(54) IMAGE RECORDING APPARATUS WITH SLIDABLE CONCEALING COVER

(75) Inventors: Stuart James Boutell, Edinburgh (GB); Christopher Geoffrey Paulson-Ellis, Edinburgh (GB); Hamish Donald Stuart Martin, Edinburgh (GB); Alastair Hugh Chisholm, Edinburgh (GB); Robin Anthony Iddon, Edinburgh (GB); Richard McBride, Buntisland (GB)

(73) Assignee: Edesix Limited, Edinburgh (GB)

( * ) Notice: Subject to any disclaimer, the term of this patent is extended or adjusted under 35 U.S.C. 154(b) by 112 days.

(21) Appl. No.: 13/296,328

(22) Filed: Nov. 15, 2011

(65) Prior Publication Data

US 2012/0120258 A1    May 17, 2012

(30) Foreign Application Priority Data

Nov. 15, 2010    (GB) .................................. 1019289.6

(51) Int. Cl.
*H04N 7/18*    (2006.01)
*H04N 5/225*    (2006.01)
*G03B 17/00*    (2006.01)
*G03B 9/08*    (2006.01)

(52) U.S. Cl.
USPC ........... 348/158; 348/373; 348/374; 348/376; 396/448; 396/449; 396/450

(58) Field of Classification Search
CPC ..... G06F 1/1677; G06F 1/1624; G06F 1/163; G06F 1/1616; G06F 1/1671; H04N 5/2251; H04N 5/2252; H04N 5/23248; H04N 5/23287; H04N 5/2259; G02B 27/017; G02B 2027/0138; G02B 2027/0187; G02B 27/646

USPC ............ 348/208.01–208.99, 211.99, 211.14, 348/158, 373–376; 396/448, 450
See application file for complete search history.

(56) References Cited

U.S. PATENT DOCUMENTS

| | | | |
|---|---|---|---|
| 5,107,287 A * | 4/1992 | Swayze ......................... | 396/424 |
| 5,682,199 A * | 10/1997 | Lankford ........................ | 348/72 |
| 6,356,437 B1 * | 3/2002 | Mitchell et al. .......... | 361/679.03 |
| 6,466,232 B1 * | 10/2002 | Newell et al. ................. | 715/700 |

(Continued)

FOREIGN PATENT DOCUMENTS

| CN | 201628836 U | 11/2010 |
|---|---|---|
| GB | 2395081 A | 5/2004 |

(Continued)

*Primary Examiner* — Chia-Wei A Chen
(74) *Attorney, Agent, or Firm* — Michael J. Feigin, Esq.; Feigin & Associates, LLC

(57) ABSTRACT

A body-mountable image capture device comprising a device body and a cover slidably mounted onto the device body, the device body comprising a camera, the cover sliding between a first position and a second position such that in the first position the camera is concealed and in the second position the camera is exposed. The body-mountable image capture device comprises activation means operable to initiate the camera when the cover is in the second position and the camera is exposed. The orientation of the camera is adjustable with respect to that of the device body such that the orientation of the camera can be maintained. The orientation of the camera may be automatically adjusted to keep the field of view generally horizontal. The camera may automatically rotate left and right in a horizontal plane responsive to movement of a head mounted sensor to thereby track a user's head movements.

16 Claims, 12 Drawing Sheets

(56) References Cited

U.S. PATENT DOCUMENTS

| | | | |
|---|---|---|---|
| 6,522,531 B1 * | 2/2003 | Quintana et al. | 361/679.03 |
| 6,770,880 B2 * | 8/2004 | Nakamura et al. | 250/330 |
| 7,212,231 B2 * | 5/2007 | Ohta | 348/208.3 |
| 7,274,131 B2 * | 9/2007 | Li et al. | 310/328 |
| 7,812,507 B2 * | 10/2010 | Takahashi et al. | 310/328 |
| 7,893,958 B1 * | 2/2011 | D'Agostino | 348/148 |
| 8,179,007 B2 * | 5/2012 | Van Der Walt | 310/90.5 |
| 8,265,793 B2 * | 9/2012 | Cross et al. | 700/259 |
| 8,332,000 B2 * | 12/2012 | Ladouceur et al. | 455/575.4 |
| 2002/0044214 A1 * | 4/2002 | Hovanky | 348/373 |
| 2002/0047906 A1 * | 4/2002 | Ohta | 348/208 |
| 2002/0131781 A1 * | 9/2002 | Buck | 396/419 |
| 2004/0179107 A1 * | 9/2004 | Benton | 348/211.99 |
| 2004/0201695 A1 * | 10/2004 | Inasaka | 348/207.99 |
| 2005/0078195 A1 * | 4/2005 | VanWagner | 348/231.3 |
| 2005/0113135 A1 * | 5/2005 | Goebel et al. | 455/556.1 |
| 2005/0233708 A1 * | 10/2005 | Im et al. | 455/90.3 |
| 2005/0250562 A1 * | 11/2005 | Carroll | 455/575.3 |
| 2006/0019614 A1 * | 1/2006 | Yamasaki | 455/90.2 |
| 2006/0061660 A1 * | 3/2006 | Brackmann | 348/208.1 |
| 2006/0082657 A1 * | 4/2006 | Meier | 348/208.7 |
| 2006/0098119 A1 | 5/2006 | Lee | |
| 2006/0197843 A1 * | 9/2006 | Yoshimatsu | 348/219.1 |
| 2006/0203124 A1 * | 9/2006 | Park et al. | 348/376 |
| 2006/0262274 A1 * | 11/2006 | Brown et al. | 352/243 |
| 2007/0041721 A1 * | 2/2007 | Ito et al. | 396/55 |
| 2007/0052832 A1 * | 3/2007 | Bae et al. | 348/333.12 |
| 2007/0281740 A1 * | 12/2007 | Sato et al. | 455/556.1 |
| 2008/0205696 A1 * | 8/2008 | Thompson | 382/100 |
| 2008/0218436 A1 * | 9/2008 | Lipscomb | 345/8 |
| 2009/0039734 A1 * | 2/2009 | Takahashi et al. | 310/323.02 |
| 2009/0058227 A1 * | 3/2009 | Takahashi et al. | 310/323.16 |
| 2009/0075692 A1 | 3/2009 | Park et al. | |
| 2009/0172530 A1 * | 7/2009 | Chang | 715/700 |
| 2009/0286575 A1 * | 11/2009 | Taniguchi et al. | 455/566 |
| 2009/0296331 A1 * | 12/2009 | Choy | 361/679.09 |
| 2010/0004038 A1 * | 1/2010 | Kwak et al. | 455/575.4 |
| 2010/0159984 A1 * | 6/2010 | Nguyen et al. | 455/556.1 |
| 2010/0277617 A1 * | 11/2010 | Hollinger | 348/231.99 |
| 2011/0029107 A1 * | 2/2011 | Lin | 700/94 |
| 2011/0086681 A1 * | 4/2011 | Ladouceur et al. | 455/575.4 |

FOREIGN PATENT DOCUMENTS

| | | |
|---|---|---|
| GB | 2413235 A | 10/2005 |
| JP | 8084280 A | 9/1994 |
| JP | 2003241300 A | 8/2003 |
| WO | WO 2008142380 A1 | 11/2008 |

* cited by examiner

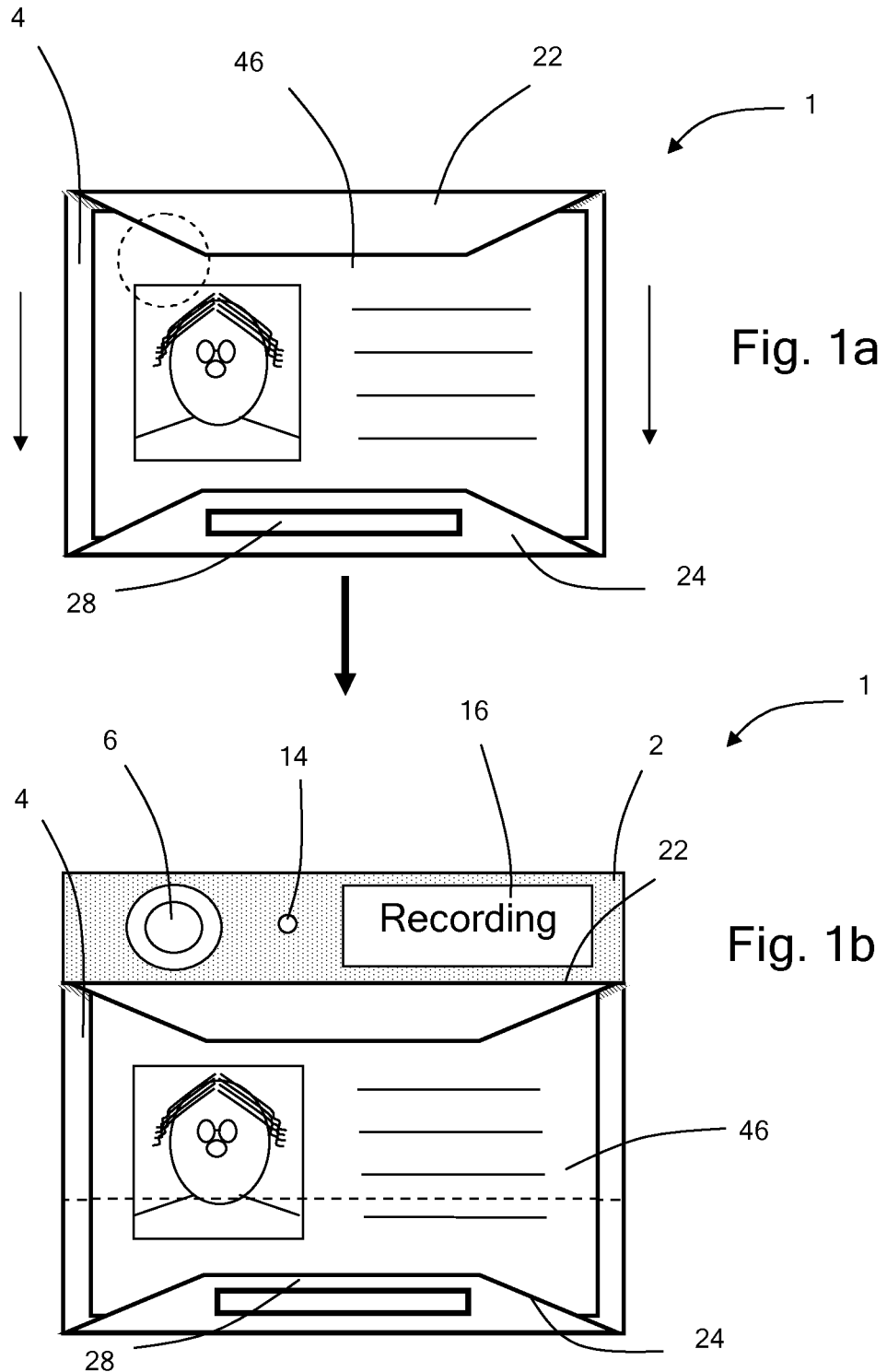

IMAGE RECORDING APPARATUS WITH SLIDABLE CONCEALING COVER

FIELD OF THE INVENTION

The invention relates to body-mountable image recording apparatus.

BACKGROUND TO THE INVENTION

In many businesses, for example, in retail, hospitality and social services, employees are required to interact with the public in the course of their duties. In extreme circumstances these encounters can become hostile and the employee can feel threatened. In such circumstances, it can be beneficial for the employee to have a record of what transpires during the encounter, for example, a record of the conversation, witnesses or other evidence. For security personnel, including police officers, obtaining and storing records suitable for use as evidence can be essential.

Conversations and interviews are routinely recorded in controlled environments where the interviewer can have the recording equipment installed on a permanent or semi-permanent basis. For example, police interview rooms typically have microphones installed for the police officer's use when interviewing members of the public. However, there are many situations where an employee is not in a controlled environment during the course of their duties, and is required to carry out their duties in a public environment, or to go out to a member of the public's place of residence or place of business. Therefore, it would be beneficial to have a portable method of recording an incident or conversation that can be used on the move.

There are a number of methods known to solve these problems. For example, the employee may wear or carry a microphone to record a conversation, or carry a video camera to record the event. However, carrying a conventional microphone or video camera and any additional equipment to record the conversation may be inconvenient for the employee. Furthermore, a member of the public has no way of knowing whether or not the equipment is recording, and may cause the member of the public to be ill-at-ease, making the job of the employee more difficult, and may in some countries breach data protection laws.

One aspect of the current invention is aimed towards at least partially solving this problem, by providing recording apparatus that is convenient to use for the employee and provide surety for the member of the public being recorded as to whether the apparatus is active.

An additional problem for employees when interacting with members of the public is that if the member of the public can see that they are, or may be recorded, either with a camera and/or microphone, they may react adversely. For example, a person otherwise well disposed towards the employee, may be put on their guard if they can see that they will be recorded in some circumstances. This can make the employees task more difficult than would otherwise have been the case. Some embodiments of the present invention aim to address this problem.

A further problem for employees when interacting with the public is that the intended subjects of any recording do not often remain stationary and the employee may not realise that the subject has moved out of the field of view of the recording equipment. Such recordings are subsequently of little use to the employer. Some embodiments of the invention address this problem.

SUMMARY OF THE INVENTION

According to a first aspect of the present invention, there is presented a body-mountable image capture device comprising a device body and a cover slidably mounted onto the body, the device body comprising a camera, wherein the cover is operable to slide between a first position and a second position such that in the first position the camera is concealed by the cover and in the second position the camera is exposed.

By "body-mountable" we mean that the image capture device may be mounted, attached or otherwise worn on the body of the user, and operated whilst mounted on the body of the user, rather than, for example, hand-held in normal operation. The body-mountable image capture device is typically adapted to be mounted on the user's chest.

Preferably, the body-mountable image capture device further comprises an activation device operable to activate the camera when the cover is in the second position. The activation device preferably deactivates the camera when the cover is in the first position. The activation device may deactivate the camera when the cover is between the first and second position.

Typically, the body-mountable image capture device records images when activated and does not record images when deactivated.

Therefore, the body-mountable image capture device is only activated, and therefore recording, when the camera is exposed (the cover is in the second position), and is deactivated when the camera is concealed (the cover is in the first position). Accordingly, a subject of the body-mountable image capture device may be reassured that they are only being recorded when they can see the camera.

The presence of recording devices, such as image capture devices, may have an adverse effect on the interaction between a user (for example, an employee) and the subject of any recording (for example, a member of the public), and the subject may become defensive or apprehensive towards the user potentially hindering the user's task.

Therefore, the body-mountable image capture device of the current aspect of the invention has the advantage that the subject interacting with the user is not unnecessarily affected by the presence of the body-mountable image capture device unless the user deems it necessary to record them. For example, the user may warn the subject they are about to be recorded, or ask the subject's permission to record them.

Preferably, the activation device comprises a magnetic proximity switch. Alternatively, the activation device may comprise a toggle switch, a rocker switch or a push-button switch.

Preferably, the camera continuously captures images when the cover is in the second position. The continuously captured images may form a video sequence or video recording. Alternatively, the camera may capture one or more individual images when the cover is in the second position.

The device body may comprise a visual warning. The visual warning may be indicative to a subject that they are being recorded. Preferably, the visual warning comprises text such as the word "RECORDING", for example. However, the visual warning may comprise a light emitting source such as an LED, for example, or a combination of a light emitting source and text. The visual warning is typically adjacent (for example, above, below, to the side of or extends around) the camera. This draws a viewer's eye to the camera.

Preferably, the visual warning is located on the device body such that it is concealed when the cover is in the first position and exposed when the camera is in the second position. Thus, the visual warning will be provided to any subject whose actions are being recorded, but hidden when recording is not taking place.

In embodiments where the visual warning comprises a light emitting source such as an LED, for example, the visual warning may be activated when the cover is moved from the first position to the second position. The visual warning may be deactivated when the cover is moved from the second position to the first position. Therefore, the visual warning may only be activated when the cover is in the second position and the visual warning is exposed.

The orientation of the camera may be adjustable with respect to that of the device body when the cover is in the second position such as to maintain the orientation of the camera. Therefore, if the orientation of the device body of the body-mountable image capture device changes whilst recording a subject, the orientation of the camera may be adjusted to reacquire the subject of the recording. For example, the orientation of the camera may be adjustable with respect to that of the device body in a vertical plane. The orientation of the camera may be adjustable with respect to that of the device body in a horizontal plane.

By "orientation of the camera" we refer to the direction in which the centre of the field of view of the camera extends. Rotation of the camera changes the orientation of the camera in the plane of rotation and therefore the field of view captured by the camera. Accordingly, maintaining the orientation of the camera maintains the field of view and any subject being recorded remains within that field of view.

The orientation of a body-mountable image capture device may vary during use. For example, a body-mountable image capture device attached to the front of a user's clothing may be initially oriented such that a subject directly in front of the user is within the field of view of the camera of the body-mountable image capture device. During use, however, the orientation of the body-mountable image capture device may change. For example, the clothing the body-mountable image capture device is attached to may move or stretch such that the orientation of the camera is altered and the field of view captured by the camera no longer includes the original subject. In such a situation, a device with a static camera attached to the device body would require the user to readjust the orientation of the entire device to re-acquire the original subject in the field of view of the camera. The device may move again and may require constant adjustment by the user.

Therefore, a body-mountable image capture device where the orientation of the camera can be adjusted relative to that of the device body has the advantage that the user may adjust the orientation of the camera to compensate for the change of orientation of the device body and not be required to change the position of the entire device.

The field of view of the camera may extend above and below the horizontal plane. The field of view of the camera may extend by between 10 and 30 degrees above and below the horizontal plane. For example, the field of view of the camera may extend 20 degrees above and below the horizontal plane to give a total of 40 degrees.

The field of view of the camera may extend by at least 40 degrees in the horizontal plane, preferably at least 55 degrees in the horizontal plane and more preferably at least 70 degrees in the horizontal plane.

The orientation of the camera may be adjusted manually by the user. The orientation of the camera may be adjusted indirectly such as via a control on the body, or directly such as by physically adjusting the camera, for example.

Preferably, the orientation of the camera is automatically adjustable (that is to say, adjusted in use by automatic means) with respect to the orientation of the device body when the cover is in the second position such as to maintain the orientation of the camera in at least one plane. The orientation of the camera may be automatically adjustable in a vertical plane with respect to that of the device body when the cover is in the second position such as to maintain the orientation of the camera in a vertical plane. The orientation of the camera may be automatically adjustable in the horizontal plane with respect to that of the device body when the cover is in the second position such as to maintain the camera orientation in the horizontal plane. Thus, the camera may be mounted to the device body using an automatically orientation adjusting mounting.

The orientation of the camera may be automatically adjustable with respect to the orientation of the device body such as to maintain the orientation of the camera relative to the horizontal in the event that the orientation of the device body changes in the vertical plane.

Preferably, the orientation of the camera is adjustable with respect to the orientation of the device body both manually and automatically such that the orientation of the camera with respect to the device body is manually determined by the user and then automatically maintained.

The orientation of the camera with respect to the device body may be manually determined by the user and then automatically maintained.

In embodiments where the camera may only be adjusted manually, the user may be unaware that the orientation of the device body has changed and therefore may not appreciate that the camera orientation requires adjustment. Therefore, when the orientation of the device body changes, the orientation of the camera changes and accordingly, the field of view of the camera is altered. The intended subject of the recording may no longer be within the altered field of view of the camera, and so the resulting recording may not be of use to the user.

A device which automatically adjusts the orientation of the camera with respect to that of the device body has the advantage that the vertical orientation of the camera may be maintained such that the subject of a recording remains within the field of view of the camera, for example, even if the orientation of the device body changes during use and the user is unaware of this change.

For example, the camera may remain oriented horizontally even though the device body is tilted in a vertical plane as the user moves around.

The body-mountable image capture device may be operable to automatically adjust the orientation of the camera relative to that of the device body gradually.

Gradual automatic adjustment allows a smoother series of images to be recorded with no sudden changes to the field of view. In addition, gradual automatic adjustment would act to dampen temporary changes in the orientation of the device body as may occur when the user walks along, for example.

Preferably, the body-mountable image capture device further comprises an adjustable mounting by which the camera is mounted to the body. The adjustable mounting may be operable to allow the orientation of the camera to be adjusted relative to that of the body. The adjustable mounting may comprise one or more actuators which may be used to adjust the orientation of the camera relative to that of the device body in one or more axes. The actuators may be manually adjusted. Alternatively, the actuators may be automatically adjusted, either mechanically or electronically.

The adjustable mounting may be operable to automatically adjust the orientation of the camera relative to that of the device body such that the orientation of the camera remains constant in at least one plane. The adjustable mounting may comprise one or more automatically controlled actuators, one or more of which may be a piezoelectric actuator. The adjustable mounting may comprise a tilt sensor. The one or more actuators are typically automatically controlled responsive to measurements made by the tilt sensor. A tilt sensor may take the form of an accelerometer which determines orientation from the sensed direction of the force due to gravity. When the tilt sensor detects that the camera has been rotated vertically, for example, the one or more actuators may be automatically activated to return the camera to its original orientation.

The adjustable mounting may comprise a gimbal or a plurality of gimbals. A gimbal comprises an axis around which the gimbal is free to rotate. The camera is mounted on the gimbal and the gimbal is attached to the device body such that rotation of the device body around the axis of the gimbal causes the camera to counter-rotate relative to the device body around the same axis and thus remain in the original orientation.

The adjustable mounting may comprise a graduation element operable to slow the automatic adjustment to gradually maintain the orientation of the camera. The graduation element may resist the rotation of a camera mounted upon a gimbal, for example.

The body-mounted image capture device may comprise a plurality of cameras, a tilt sensor and a selection module; each camera within the plurality of cameras oriented having a field of view at a unique angle such that the collective field of view of the plurality of cameras forms a continuous field of view greater than that of any single camera within the plurality of cameras; the tilt sensor is operable to produce a tilt signal, and the selection module is operable to select a single camera within the plurality of cameras dependant on the tilt signal, and images are recorded from the selected camera. The invention also extends to such a device.

The tilt sensor may produce a tilt signal relative to the orientation of the body-mounted image capture device in the vertical plane. The tilt signal produced by the tilt sensor may correspond to a tilt angle relative to the horizontal in the vertical plane.

The single camera within the plurality of cameras associated with the tilt signal produced by the tilt sensor may be the single camera having a field of view with an orientation which corresponds most closely to a horizontal orientation. Accordingly, selecting the single camera with a field of view having an orientation which most closely corresponds to horizontal maintains the field of view and any subject being recorded remains within that field of view.

The orientation of the field of view of one camera within the plurality of cameras may differ from the next camera within the plurality of cameras by 20 to 50 degrees in the vertical plane.

The orientation of each camera within the plurality of cameras may be unique. Alternatively, the orientation of the cameras within the plurality of cameras may be the same and the body-mountable image capture device may comprise optical elements associated with each of the cameras within the plurality of cameras such that the orientation of the field of view of each camera within the plurality of cameras is unique During use, images may be recorded from a single camera from within the plurality of cameras. The single camera from which data is to be recorded from may be determined by the signal output by the tilt sensor.

Alternatively, images may be recorded from the plurality of cameras simultaneously and the required images selected by the user at a later stage.

Preferably, the device body comprises storage media, such as a hard drive, a solid-state drive (SSD), or memory such as RAM, ROM, PROM, EPROM or EEPROM memory. Alternatively, the storage media may comprise a removable memory card such as a Secure Digital (SD) card, a PC card or a Multimedia Card (MMC), for example.

Preferably, the device body comprises a battery unit operable to power the body-mountable image capture device. Preferably, the battery unit is a rechargeable battery unit such that when the battery unit runs down it may be removed from the body-mountable image capture device and recharged.

Preferably, the cover comprises an exterior surface facing away from the device body of the image capture device, and an interior surface facing towards the device body of the image capture device. Typically, the exterior surface of the cover may be generally planar, but the exterior surface of the cover may alternatively be curved. The exterior surface of the cover may comprise a first and a second pair of opposed parallel edges. The opposed pair of parallel edges may be oriented such that the edges of the first pair are at an angle to the edges of the second pair. Preferably, the first pair of edges is perpendicular to the second pair of edges.

Preferably, the cover comprises a manually operable formation to assist a user to move the cover between the first and second positions. The manually operable formation is typically operable by the finger of a user but may be operable by the hand of the user. Typically, the manually operable formation assists the user move the cover in a downward direction from the first position to the second position.

Typically the manually operable formation is located on the exterior surface of the cover, but may be located on the interior surface of the cover, overhanging the device body of the image capture device. Alternatively, a manually operable formation may be located on both the exterior and interior surfaces to form a T-shape in cross section, for example.

Users working outdoors may be wearing gloves and may therefore experience difficulties operating intricate or small devices, or gaining purchase on smooth surfaces without having to remove said gloves. Therefore, the user may experience difficulties moving the cover from the first position to the second position. The manually operable formation is a sufficiently large feature that a user can move the cover from the first position to the second position easily even when wearing gloves. Accordingly, the manually operable formation of the present aspect of the invention overcomes this problem.

The manually operable formation may comprise a raised portion extending perpendicularly away from the exterior surface of the cover such that the user is afforded greater tactile contact with the cover and therefore allows ease of movement of the cover between the first and second positions. Alternatively, the manually operable formation may comprise a depressed portion within the cover to assist the finger of the operator to slide the cover between the first and second positions.

The manually operable formation may comprise a patterned or textured region of the cover. The manually operable formation may comprise both a patterned or textured region of the cover and a raised or depressed portion.

The cover may comprise a card holder. Typically, the card holder is located on the exterior surface of the cover. The card holder may be configured to retain a card such that the face of the card may be seen whilst retained within the card holder. The card retained may be a form of identification of the user or of the company the user represents. Alternatively, the card retained may be a safety measure, such as a radiation badge for users in hazardous environments where radioactive sources may be present, for example.

Typically, the card holder may be configured to retain a card of standard credit card dimensions. That is, a card of dimensions in the range 50-60 mm×80-90 mm, preferably of dimensions 55 mm×85 mm.

The body-mountable image capture device may comprise a radio transceiver. The body-mountable image capture device may comprise a radio transceiver for bidirectional audio communication. For example, the body-mountable image capture device may be a body-mountable radio transceiver (e.g. walkie-talkie or intercom) having a said camera (and thereby being both a body-mountable radio transceiver and a body-mountable image capture device). Thus, the body-mountable image capture device may for example, comprise a microphone (or interface for a microphone) and loudspeaker (or interface for a loudspeaker).

Preferably, the body-mountable image capture device comprises attachment means (such as one or more fixtures) operable to attach the body-mountable image capture device to the user. Typically the attachment means attaches the body-mountable image capture device to the clothing of the user. Generally, the body-mountable image capture device is attached to the front of the user's torso.

Preferably, the attachment means comprises a single attachment point such as a pin, clip, clasp or other such method for attaching the body-mountable image capture means to the device body of the user. Typically, the body-mountable image capture means is attached to the clothing of the user, and not held by the user.

The attachment means may form a hook operable to be coupled to a loop on the clothing of the user. For example, the user may wear a uniform with a loop designed for an identification badge, or to allow a communication device to be attached.

Alternatively, the attachment means may comprise a plurality of attachment points. The plurality of attachment points may be apertures operable for clips to be attached to, for example the clips of standard lanyards. A lanyard may be used to attach the image capture device such that the body-mountable image capture device may hang around the user's neck to ensure that the device is visible at all times. In this example, the device may be attached at two points along the device body to provide added stability by, for example. Alternatively, the lanyard may be attached to one point on the device body.

Preferably, the body-mountable image capture device further comprises a communication interface operable to transmit images stored on the storage media to an external device. The communication interface may be an external port on the device body, such as a Universal Serial Bus (USB) port, a parallel communications port or a Firewire (Firewire is a trade mark of Apple Inc. Corporation) port. Alternatively, the communication interface may be a wireless communication device. For example, the communication interface may be a Bluetooth, Wi-Fi IEEE 802.11 or infra red transmitter (Bluetooth is a trade mark of the Bluetooth Special Interest Group, Inc.).

The external device may be a central computer or server, operable to store and analyse the data collected by the body-mountable image capture device or a plurality of body-mountable image capture devices. The body-mountable image capture device may be operable to transmit captured images (e.g. still images or video) through the communication interface in response to a request received through the communication interface.

Alternatively, the external device may be a communication device operable to relay data wirelessly to a remote control centre. The said communication device may comprise a radio transceiver for bidirectional audio communication with the remote control centre (e.g. walkie-talkie or intercom). The communication device may be body-mountable. The communication device may be operable to transmit data (e.g. still images or video) captured by the body-mountable image capture device to the remote control centre upon receipt of a request from the remote control centre for the data to be transmitted. Thus the communication device may have a first wireless transceiver for bidirectional communication with the remote control centre and a second wireless (or wired) transceiver for bidirectional communication with the body-mountable image capture device.

For example, a user may wear a body-mountable image capture device and a communication device mounted to the front of their torso. An operator at the remote source may wish to see what the user is seeing and issue a request to the communication device. The communication device, upon receipt of the request, may retrieve images from the body-mountable image capture device via the communication interface of the body-mountable image capture device (e.g. a Bluetooth connection), and transmit the retrieved images to the remote source. Where the communication device comprises a radio transceiver, the communication device may transmit the images via the radio transceiver.

The body-mountable image capture device may comprise at least one microphone operable to record, for example, conversations between the user and a subject that is being video recorded by the camera. The sound data may be recorded synchronously with the camera data such that the two are operable to be played back simultaneously.

Preferably, the at least one microphone is located on the device body. However, the at least one microphone may be located on the cover of the body-mountable image capture device.

The image capture device may comprise a communication interface operable to receive data from a remote position sensor and to automatically adjust the orientation of the camera responsive to the received data. Apparatus comprising such a body-mountable image capture device and remote position sensor is described further below in relation to the third aspect of the invention.

According to a second aspect of the invention there is presented a body-mountable image capture device comprising a device body, the device body comprising a camera, the camera is adjustably mounted to the device body to enable the orientation of the camera relative to the device body to be adjusted.

Therefore, if the orientation of the device body of the body-mountable image capture device changes whilst recording a specific subject, the orientation of the camera may be adjusted to reacquire the subject of the recording. For example, the orientation of the camera may be adjustable with respect to that of the device body in a vertical plane. The orientation of the camera may be adjustable with respect to that of the device body in a horizontal plane.

The orientation of a body-mountable image capture device may vary during use. For example, a body-mountable image capture device attached to the front of a user's clothing may be initially oriented such that a subject directly in front of the user is within the field of view of the camera of the body-mountable image capture device. During use, however, the orientation of the body-mountable image capture device may change. For example, the clothing the body-mountable image capture device is attached to may move or stretch such that the orientation of the camera is tilted downwards, for example, and the field of view no longer includes the original subject. In such a situation, a device comprising a camera statically attached to the device body of the device would require the user to readjust the orientation of the entire device to re-acquire the original subject in the field of view of the camera. The orientation of the device might be changed again and require constant adjustment of the orientation of the device by the user.

Therefore, a body-mountable image capture device where the orientation of the camera can be adjusted relative to the device body has the advantage that the user may adjust the orientation of the camera to compensate for the change of orientation of the device body without having to readjust the position of the device body.

The field of view of the camera may extend above and below the horizontal plane. The field of view of the camera may extend by between 10 and 30 degrees above and below the horizontal plane. For example, the field of view of the camera may extend 20 degrees above and below the horizontal plane to give a total of 40 degrees. The field of view of the camera may extend by at least 40 degrees in the horizontal plane, preferably at least 55 degrees in the horizontal plane and more preferably at least 70 degrees in the horizontal plane.

The orientation of the camera may be manually adjustable by the user. The orientation of the camera may be indirectly adjustable via a control on the device body such as a dial, or directly by physically adjusting the camera, for example.

Preferably, the orientation of the camera is automatically adjustable with respect to the orientation of the device body such as to maintain the orientation of the camera in at least one plane. The orientation of the camera may be automatically adjustable in a vertical plane with respect to that of the device body such as to maintain the orientation of the camera in a vertical plane. The orientation of the camera may be automatically adjustable in the horizontal plane with respect to that of the device body such as to maintain the camera orientation in the horizontal plane.

For example, the orientation of the camera may be automatically adjustable with respect to the orientation of the device body such as to maintain the orientation of the camera horizontally in the event that the vertical orientation of the device body changes.

Preferably, the orientation of the camera is adjustable with respect to the orientation of the device body both manually and automatically such that the orientation of the camera with respect to that of the device body is first adjusted manually to a preferred orientation and then subsequently automatically adjusted to maintain the preferred orientation.

In embodiments where the camera may only be adjusted manually, the user may be unaware that the orientation of the device body of the body-mountable image capture device has changed and therefore may not appreciate that the orientation of the camera requires adjustment. Therefore, when the orientation of the device body changes, the orientation of the camera changes and accordingly, the field of view of the camera is altered. The intended subject of the recording may no longer be within the altered field of view of the camera, and so the resulting recording may not be of use to the user.

Therefore, a device which automatically adjusts the orientation of the camera with respect to that of the device body has the advantage that the vertical orientation of the camera may be maintained such that the subject of a recording remains within the field of view of the camera, for example, even if the orientation of the device body changes during use and the user is unaware of this change.

For example, the camera may remain oriented horizontally even though the vertical orientation of the device body of the body-mountable image capture device changes as the user moves around.

The body-mountable image capture device may be operable to automatically adjust the orientation of the camera relative to that of the device body gradually. Gradual automatic adjustment allows a smoother series of images to be recorded with fewer sudden changes to the field of view. In addition, gradual automatic adjustment would act to dampen temporary changes in the orientation of the device body as may occur when the user walks along, for example.

Preferably, the body-mountable image capture device may further comprise an adjustable mounting by which the camera is mounted to the device body. The adjustable mounting may be operable to allow the orientation of the camera to be adjusted relative to that of the device body. The adjustable mounting may comprise actuators which may be used to adjust the orientation of the camera relative to that of the device body. The actuators may be manually adjustable.

The adjustable mounting may be operable to automatically adjust the orientation of the camera relative to that of the device body such that the orientation of the camera remains constant in at least one plane. The adjustable mounting may comprise one or more automatically controlled actuators, one or more of which may be a piezoelectric actuator. The adjustable mounting may comprise a tilt sensor. The one or more actuators are typically automatically controlled responsive to measurements made by the tilt sensor. When the tilt sensor detects that the camera has been rotated vertically, for example, the piezoelectric actuators are activated such that the tilt sensor, and so the camera, is returned to its original orientation.

The adjustable mounting may comprise a gimbal or a plurality of gimbals. A gimbal comprises an axis around which the gimbal is free to rotate. The camera is mounted on the gimbal and the gimbal is attached to the device body. Rotation of the device body around the axis of the gimbal causes the camera to counter-rotate relative to the device body around the same axis and thus remain at the original orientation.

The adjustable mounting may comprise a graduation element operable to slow the automatic adjustment to gradually maintain the orientation of the camera. The graduation element may resist the rotation of a camera mounted upon a gimbal, for example.

The image capture device may comprise a communication interface operable to receive data from a remote position sensor and to automatically adjust the orientation of the camera responsive to the received data. Apparatus comprising such a body-mountable image capture device and remote position sensor is described further below in relation to the third aspect of the invention.

Further optional features of the second aspect of the invention correspond to those described above in connection with the first aspect of the invention.

According to a third aspect of the invention, there is provided a apparatus comprising a body-mountable image capture device having a device body, and a remote position sensor, the device body comprising a camera and a data receiver operable to receive data from the remote position sensor, the remote position sensor comprising a position sensor and a data transmitter operable to transmit data to the device body; wherein the remote position sensor is mountable to a user's head and is operable to detect the position of the user's head and to transmit data to the device body; and the device body is operable to receive data from the remote position sensor and automatically adjust the orientation of the camera responsive to the received data.

Typically the device body of the body-mountable image capture device is attached to the torso of the user in use. Typically the remote position sensor is attached to the user's head in use via a headband or other head-ware such as a hat, for example.

Often in situations where an image capture device may be used, the user and subject of a recording typically do not remain static during the recording but move relatively to each other. In order to track the subject and to ensure that the subject is within the field of view of the camera it is necessary to adjust the orientation of the device whenever the subject moves. For example, in situations where the user is seated facing a defined direction, it may not be possible to adjust the orientation of a body-mountable image capture device to ensure that subjects walking past the user are within the field of view of the camera of the body-mountable image capture device.

Typically, the user is looking at an intended subject and therefore the orientation of the user's head is such that the field of view of the user includes the intended subject. Therefore, a device where the orientation or the camera is automatically adjusted to track the rotation of the user's head results in the intended subject of the recording being within the field of view of the camera.

The position sensor may be operable to detect the orientation of the user's head.

The position sensor may allow the camera to track a single plane of movement of the user's head, for example, to measure neck rotation. For example, the camera may be automatically adjusted such that the change in orientation of the user's head is detected by the position sensor and the orientation of the camera is automatically adjusted to track said change in orientation whilst remaining horizontal. Thus, the camera may pan responsive to changes of orientation of a user's head, measured by the position sensor.

The device body may comprise a communication interface operable to receive data from the position sensor. The communication interface may comprise a wired connection to the position sensor. The communication interface may comprise a wireless connection, such as infra-red, Wi-Fi IEEE 802.11 or Bluetooth, for example.

The position sensor may comprise an accelerometer operable to detect the changes in momentum of the head of the user as it begins to rotate and as it ceases to rotate. The data from the position sensor corresponding to changes of momentum of the user's head may be converted into changes in the position or orientation of the user's head.

Alternatively, the position sensor may comprise a gyroscope operable to detect changes in the orientation of the user's head, or a pair of devices and the motion of, or distance between, one of the devices (attached to the user's head, for example) relative to the second device (attached to the device body, for example) may be measured to produce data corresponding to a change in, or an absolute value of, the position or orientation of the user's head.

The body-mountable image capture device may be a body-mountable image capture device according to the first or second aspect of the invention.

Further optional features of the third aspect of the invention correspond to those described above in connection with the first and second aspects of the invention.

DESCRIPTION OF THE DRAWINGS

An example embodiment of the present invention will now be illustrated with reference to the following Figures in which:

FIG. 1 is a plan view of an embodiment of the body-mountable image capture device wherein the cover is in (A) the first position and (B) the second position;

DETAILED DESCRIPTION OF EXAMPLE EMBODIMENTS

First Embodiment

Figure 2A:
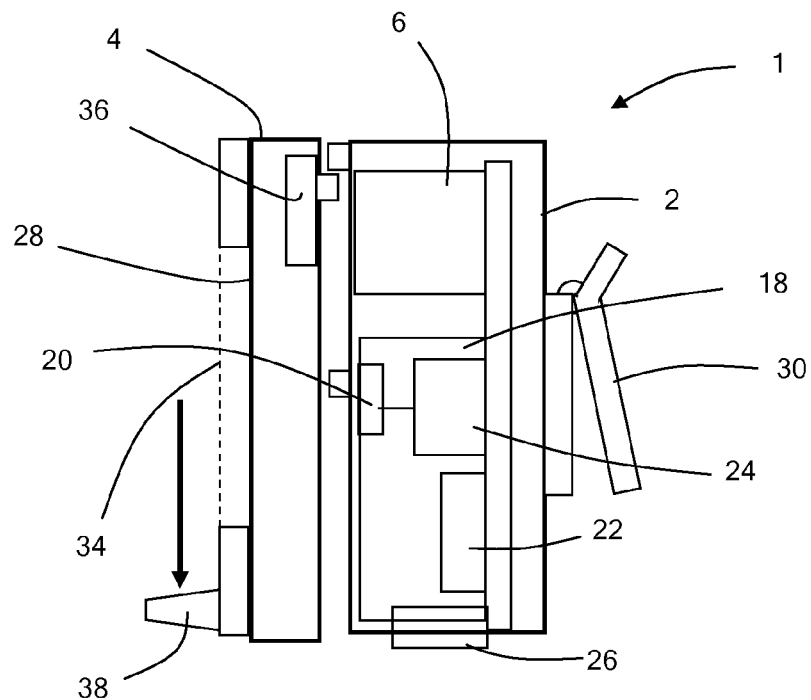
FIG. 2 is a side view of the interior of an embodiment of the body-mountable image capture device wherein the cover is in (A) the first position and (B) the second position.
Figure 2B:
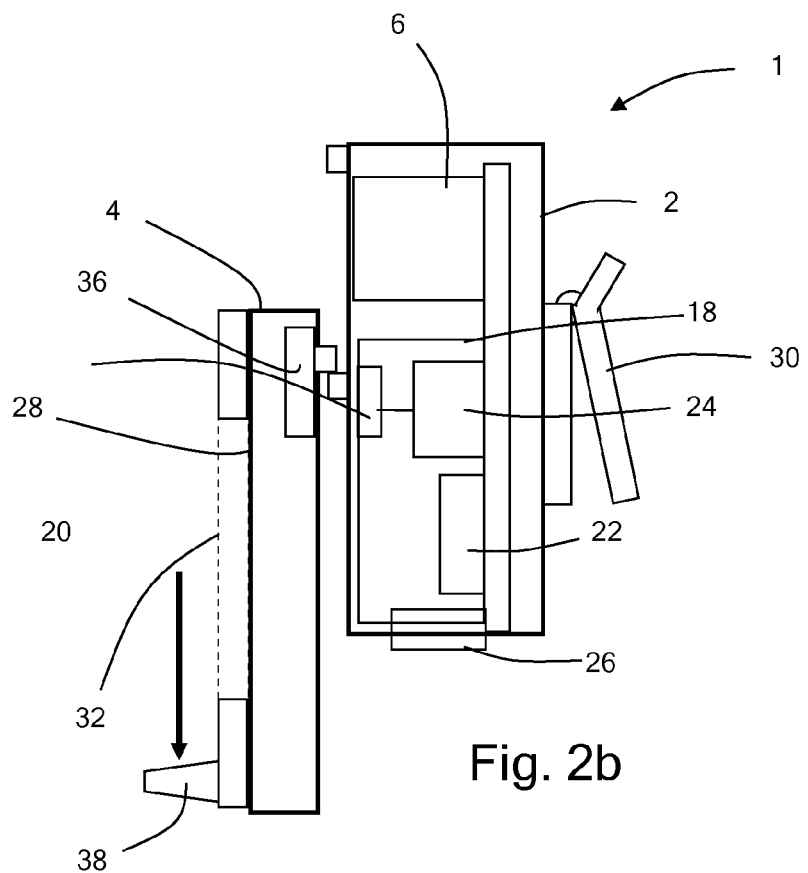
Figure 3A:
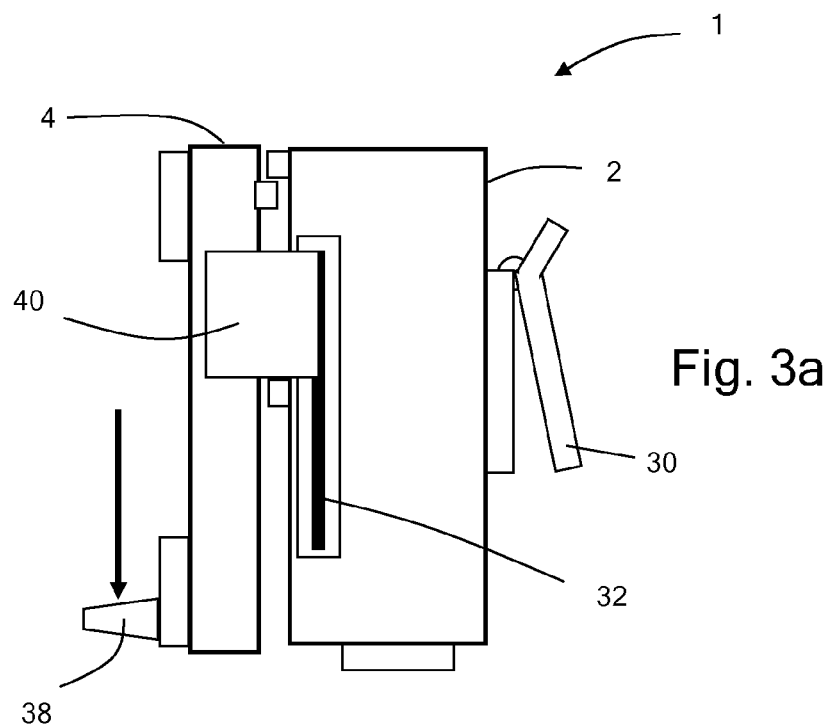
FIG. 3 is a side view of the exterior of an embodiment of the body-mountable image capture device wherein the cover is in (A) the first position and (B) the second position.
Figure 3B:
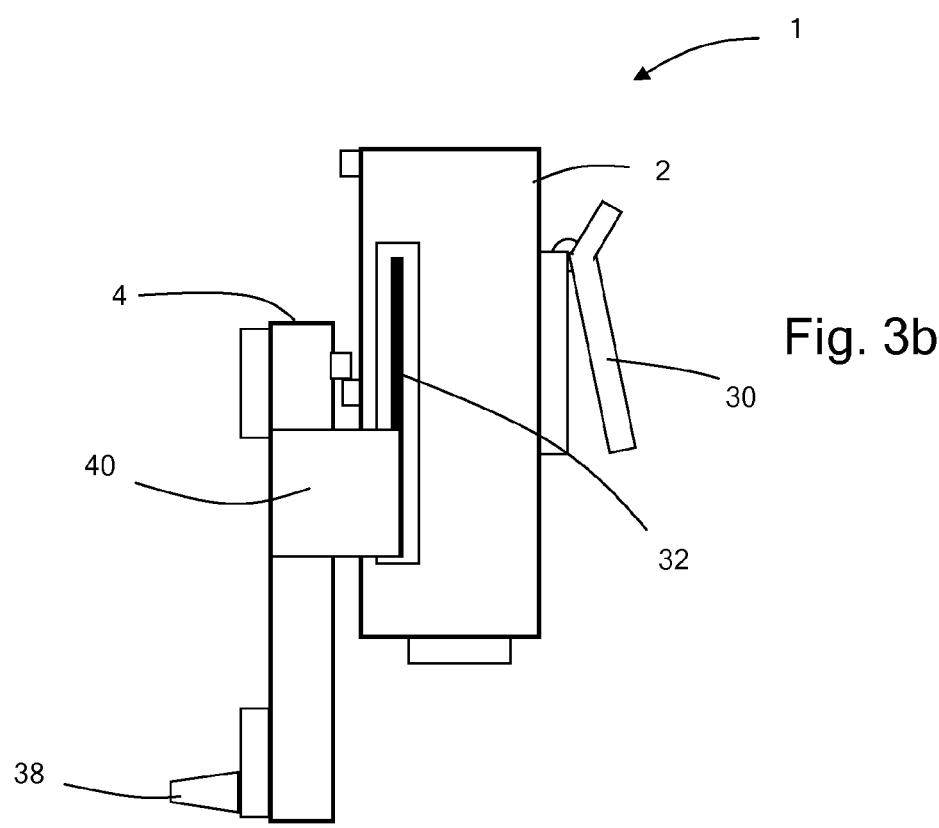

With reference to FIGS. 1 to 6, a body-mountable image capture device 1 comprises a device body 2 and a cover 4 slidably mounted onto the device body. The device body comprises a camera 6, a piezoelectric mounting 8 and tilt sensor 10 (together acting as an automatic adjustable mounting). The camera is adjustably mounted onto the device body via the piezoelectric mounting, and the tilt sensor is mounted onto the camera in such a way as to be operable to detect changes in the orientation of the camera with respect to the orientation of the device body in the vertical plane. The piezoelectric mounting connects the camera to the device body.

The device body further comprises an LED 14 adjacent to the camera and the warning text "RECORDING" 16 printed adjacent to the LED.

The device body comprises a control unit 18. The control unit comprises a magnetic proximity switch 20. The control unit is electrically connected to the camera, the LED, the piezoelectric mounting and tilt switch. The control unit comprises a flash drive 22 (acting as storage media), a processor 24 and a wireless communication device 26 (acting as both a communication interface and a data receiving interface).

The device body also comprises a replaceable battery 28 electrically connected to the control unit, a clasp 30 (acting as attachment means), and a pair of elongate receiving grooves 32 located on opposing edges of the device body.

The cover comprises a card holder 34, a magnet 36, a ridge 38 (acting as a manually operable formation) and a pair of slidable members 40 located on two opposing edges of the cover. The pair of slidable members connectively interact with the pair of elongate receiving grooves of the device body.

The cover is operable to move from a first position shown in FIG. 1a to a second position shown in FIG. 1b. When the cover moves from the first position to the second position, the pair of slidable members on the cover slidably move along the elongate receiving grooves. In the first position, the cover conceals the camera, the LED and warning text and in the second position the camera, the LED and warning text are exposed.

In operation, an identification card 46 is retained within the cardholder of the cover and the body-mountable image capture device is attached to the user's clothing via the clasp. Generally, the body-mountable image capture device is attached to the user's clothing on the user's chest using the clasp such that the orientation of the body-mountable image capture device corresponds to the orientation of the user's head when facing straight ahead. Accordingly, the field of view of the camera corresponds to at least a part of the field of view of the user when facing straight ahead.

Figure 4A:
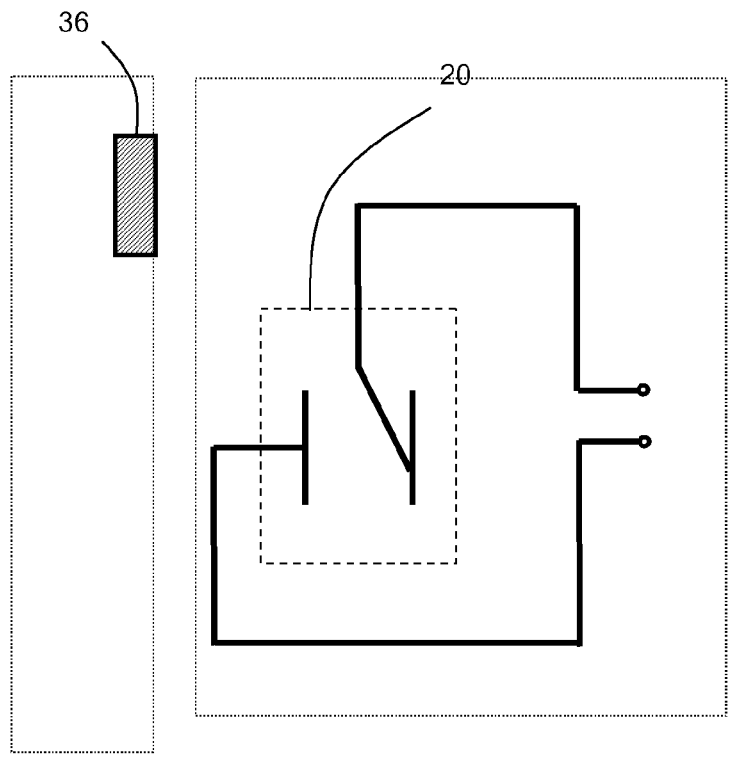
FIG. 4 is an illustration of a magnetic proximity switch.

When the user does not wish to record, the cover is retained in the first position and the camera is concealed. When the cover is in the first position the magnet is located apart from the magnetic proximity switch of the device body and when the cover is in the second position the magnet is located adjacent to the magnetic proximity switch. Therefore, when the cover is in the first position the magnet is sufficiently distant from the magnetic proximity switch that the switch is not activated. The deactivated magnetic proximity switch breaks the electrical circuit to the camera and accordingly the camera and LED are deactivated (FIG. 4a).

When the user wishes to begin recording, the user moves the cover from the first position to the second position using the ridge on the cover that provides additional purchase for the user's finger.

Figure 4B:
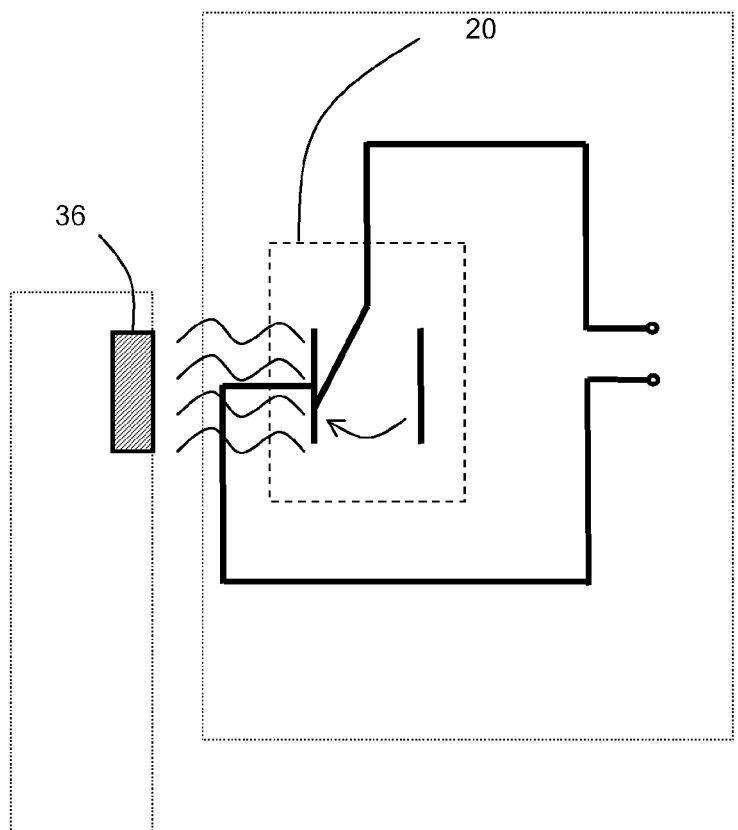
Figure 5A:
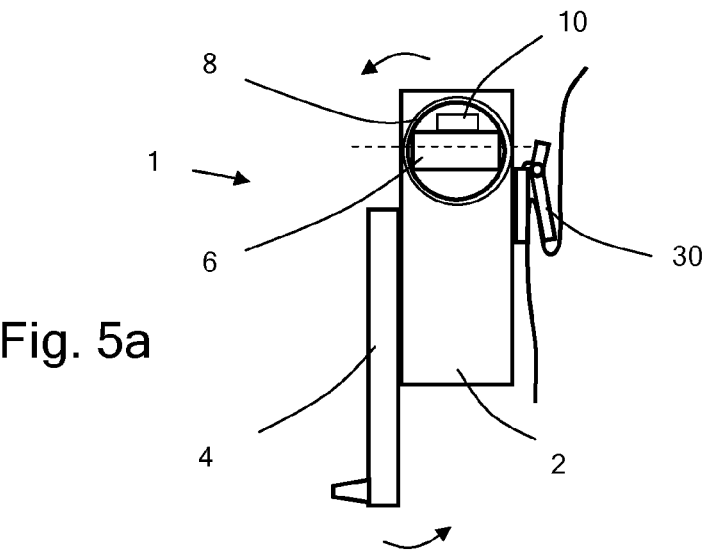
FIG. 5 (A to C) is a side view of the body-mountable image capture device showing the orientation of the camera being adjusted after the orientation of the device body has changed.
Figure 5B:
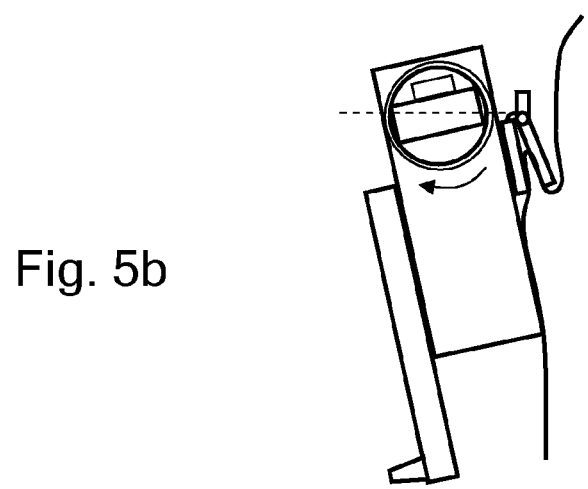
Figure 5C:
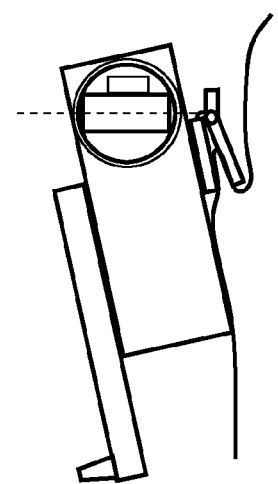
Figure 6:
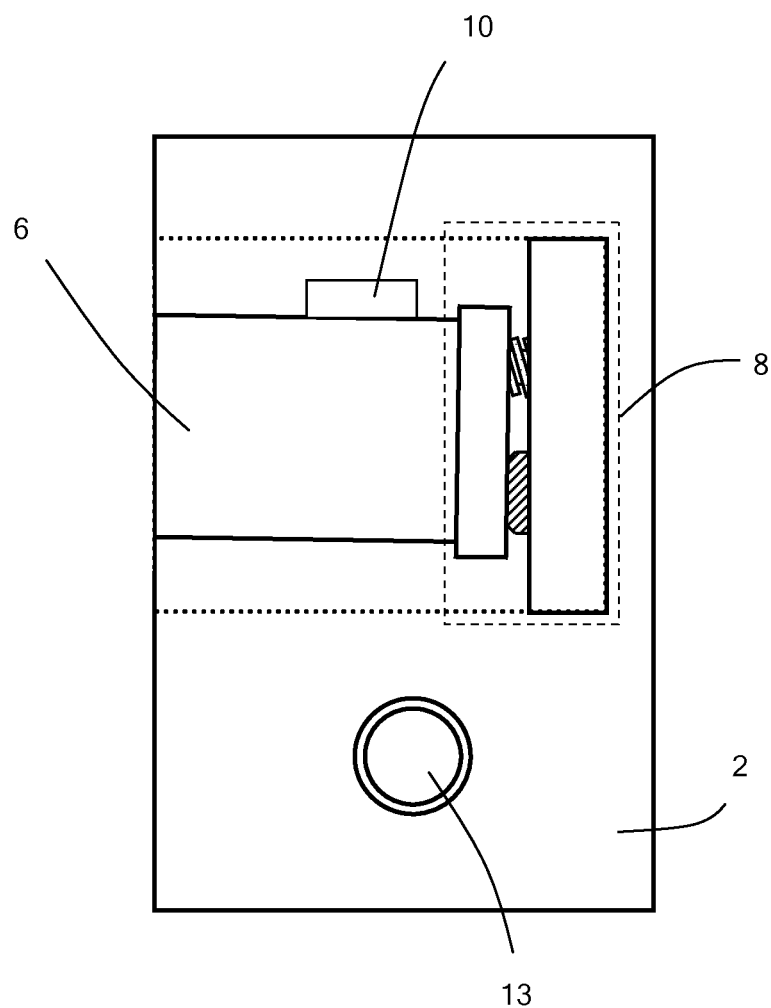
FIG. 6 is a cut-away (the dotted box) side view of the camera mounted on a piezoelectric mounting which is in turn mounted onto the device body of the body-mountable image capture device.
Figure 7A:
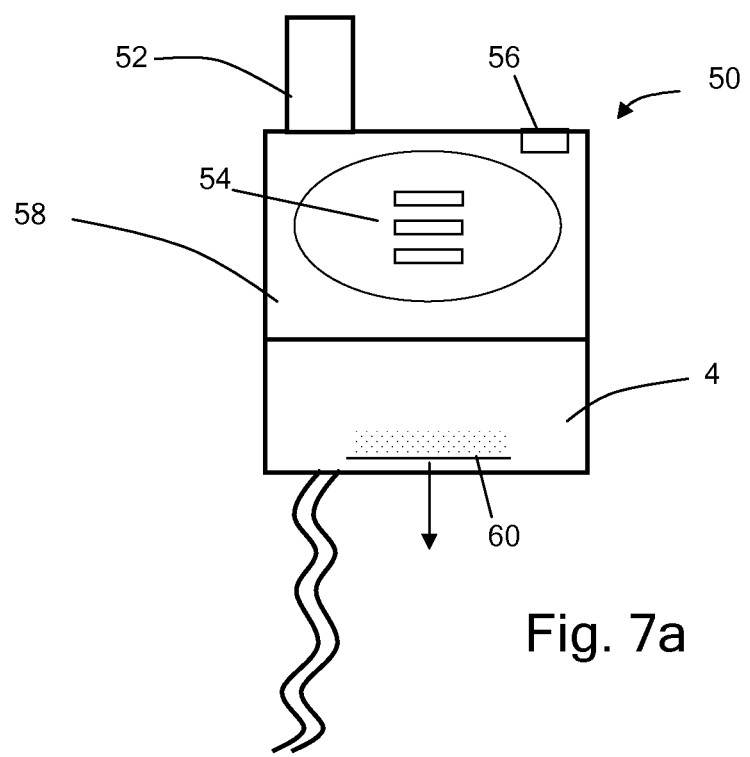
FIG. 7 is an illustration of an alternative embodiment of the body-mountable image capture device wherein the cover is in (A) the first position and (B) the second position.
Figure 7B:
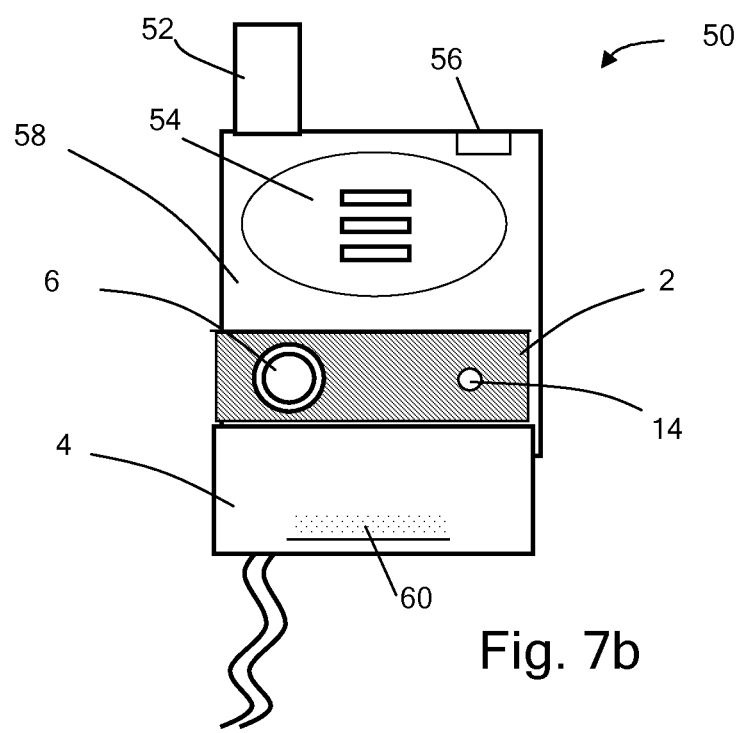

When the cover is in the second position the magnet is sufficiently close to activate the magnetic proximity switch, completing the electrical circuit to the camera and LED, and therefore activating the camera and LED (FIG. 4b).

The processor of the control unit records images taken by the camera to the flash hard drive continuously whilst the camera is activated. Therefore, whilst the cover is in the second position, the body-mountable image capture device continuously records images.

During use the body-mountable image capture device may be jostled or tilted such that the orientation of the body-mountable image capture device is altered and therefore the orientation of the camera and the field of view of the camera is correspondingly altered.

A change of orientation of the camera in the vertical plane is detected by the tilt sensor. The processor determines the sense and the magnitude of the change in orientation from data from the tilt sensor, and actuates the piezoelectric mounting to adjust the orientation of the camera until the camera has returned to its original orientation. Therefore, the orientation of the camera is maintained with respect of that of the device body and correspondingly, the field of view of the camera is maintained.

When the user wishes to finish recording, the cover of the body-mountable image capture device is returned to the first position. The magnet is displaced sufficiently far from the magnetic proximity switch to deactivate the switch and correspondingly the camera, the device stops recording images and the LED is deactivated.

When required, the device may be connected wirelessly to a remote central computer by the wireless communication device of the control unit. Images stored on the flash hard drive may then be copied to the remote central computer and deleted from the flash hard drive.

In an alternative embodiment, the device may comprise a communication port. The communication port of the device may be connected via a wired connection to a central computer such that data may be transmitted from the device to the said computer.

In a further alternative embodiment, the wireless communication device of the body mountable image capture device may relay data (e.g. still images or video) to a remote central computer or a remote control centre via a body-mounted walkie-talkie in response to a request from the remote control centre.

Thus, the remote control centre may request a photograph or video of a subject directly in front of an operative wearing the device, for example.

The walkie-talkie may comprise a low band-width transceiver for data relay to the remote control centre, for example, and a high band-width transceiver for data relay to the body-mountable image capture device. For example, the walkie-talkie may comprise a Bluetooth connection to the body-mountable image capture device by which still images or segments of video may be transferred and then relayed to the remote control centre via the low band-width transceiver.

Use of a high band-width transceiver over large distances is extremely energy consuming and as such is unsuitable for transmitting large data files, such as still images or video from a battery powered device.

Generally, the low band-width transceiver of a walkie-talkie is designed to transmit audio data between the walkie-talkie and a remote control centre or one or more additional walkie-talkies. A low band-width transceiver has sufficient capacity to relay audio data in real time but generally insufficient capacity for transmitting data such as still images or video in real time.

Therefore, the use of a walkie-talkie low band-width transceiver to only relay data from the body-mountable image capture device which have been requested allows the selected data to be transmitted to a remote control centre without significantly shortening the lifetime of the body-mountable image capture device battery.

In an alternative embodiment it may be possible to manually adjust the orientation of the camera relative to the horizontal. For example, the device may comprise a trim control 13. The trim control may be electronically connected to the piezoelectric mounting. In use the user may select an offset angle view the trim control and the piezoelectric mounting adjusts the orientation of the camera relative to the horizontal to maintain the angle defined by the user.

In a still further alternative embodiment the trimming device may be manually operable, such that the user may physically adjust the orientation of the camera to a preferred orientation. For example, the camera may be mounted to the automatically adjustable mounting by way of a mechanical trim, such as a rotatable mounting having a first portion connected to the camera and a second portion connected to the automatically adjustable mounting, and the orientation of the automatically adjustable mounting may be controlled so that the orientation of the second portion of the rotatable mounting is automatically adjusted relative to the horizon and the user can adjust the orientation to which the camera is adjusted relative to the horizon by rotating the first and second portions of the rotatable mounting relative to each other.

In alternate embodiments, the magnetic proximity switch may be replaced with a toggle switch, a rocker switch or a push-button switch. The magnet in the cover may be replaced with a tab or other formation operable to trigger the switch when the cover moves between the first and second positions. For example, in embodiments where the magnetic proximity switch is replaced by a rocker switch, the magnet may be replaced by a tab extending from the cover towards the device body such that it moves the rocker switch to the "on" position as the cover is moved from the first to the second position, and the "off" position as the cover is moved from the second position to the first position.

Figure 8A:
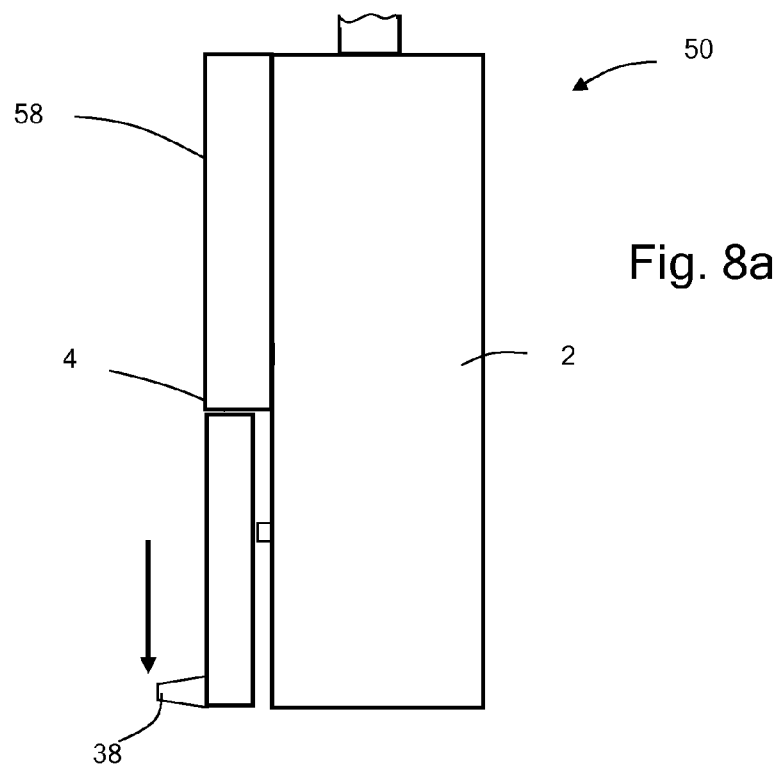
FIG. 8 is a side view of the exterior of the alternative embodiment of the body-mountable image capture device where the cover is in (A) the first position and (B) the second position.
Figure 8B:
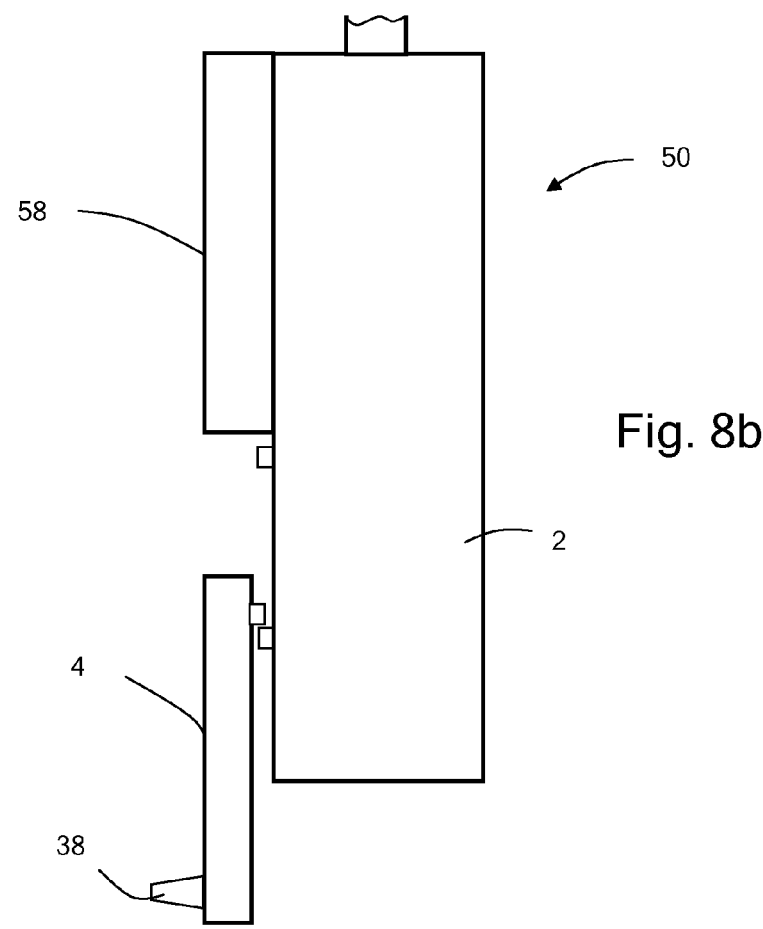
Figure 9:
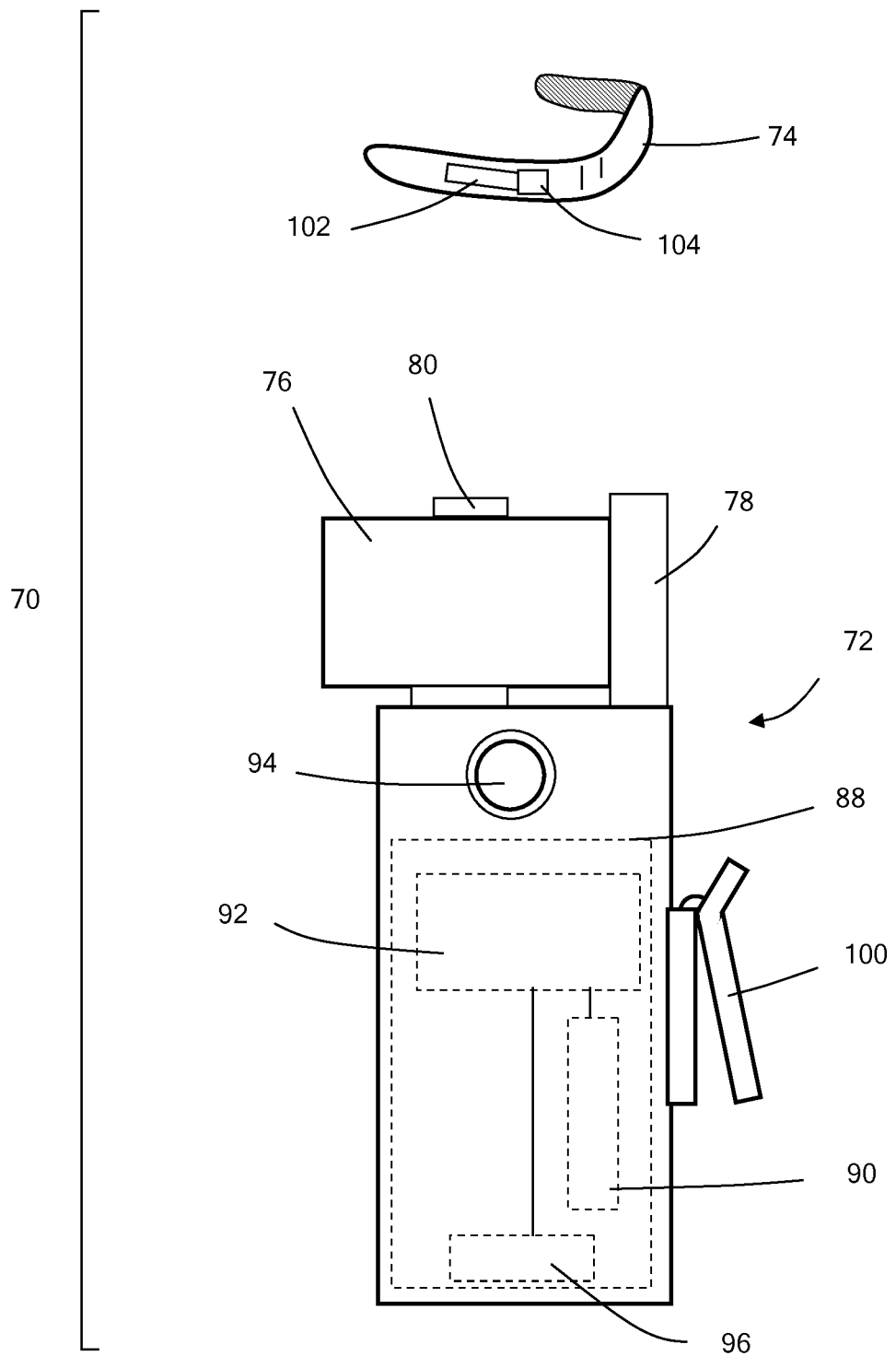
FIG. 9 is a side view of the interior of a portion of the body-mountable image capture device and the camera mountings with the head-mounted position sensor.
Figure 10A:
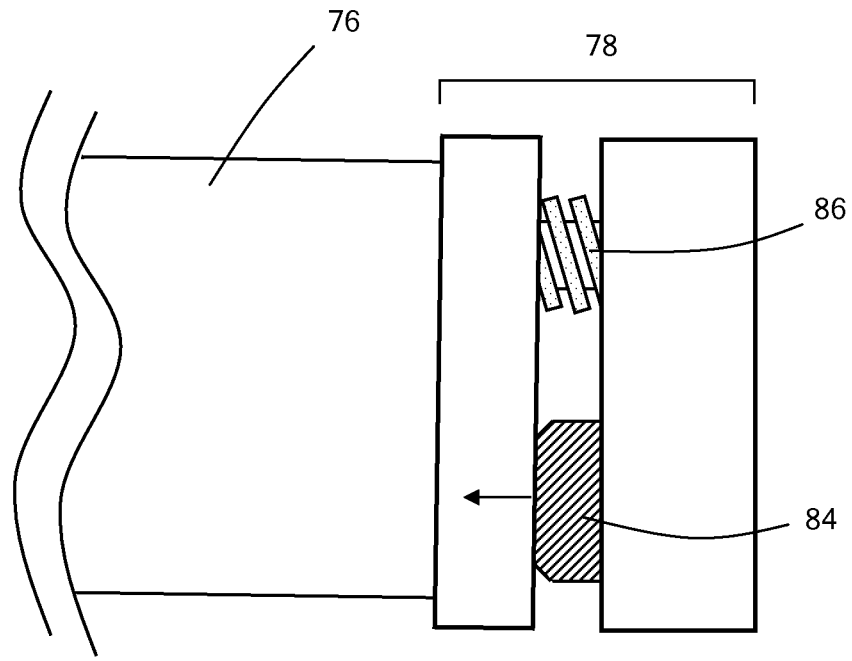
FIG. 10 is an illustration of an example piezoelectric mounting.
Figure 10B:
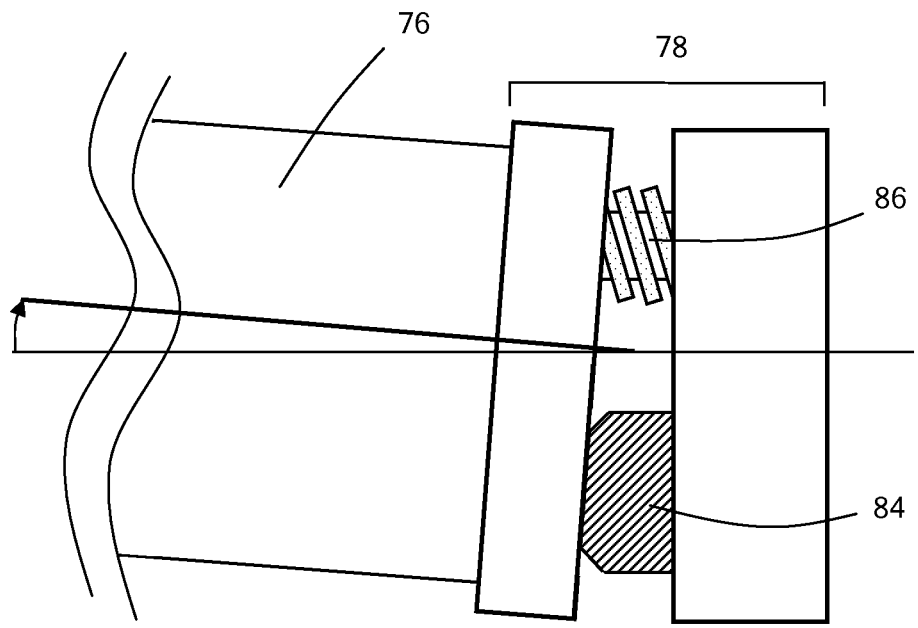
Figure 11:
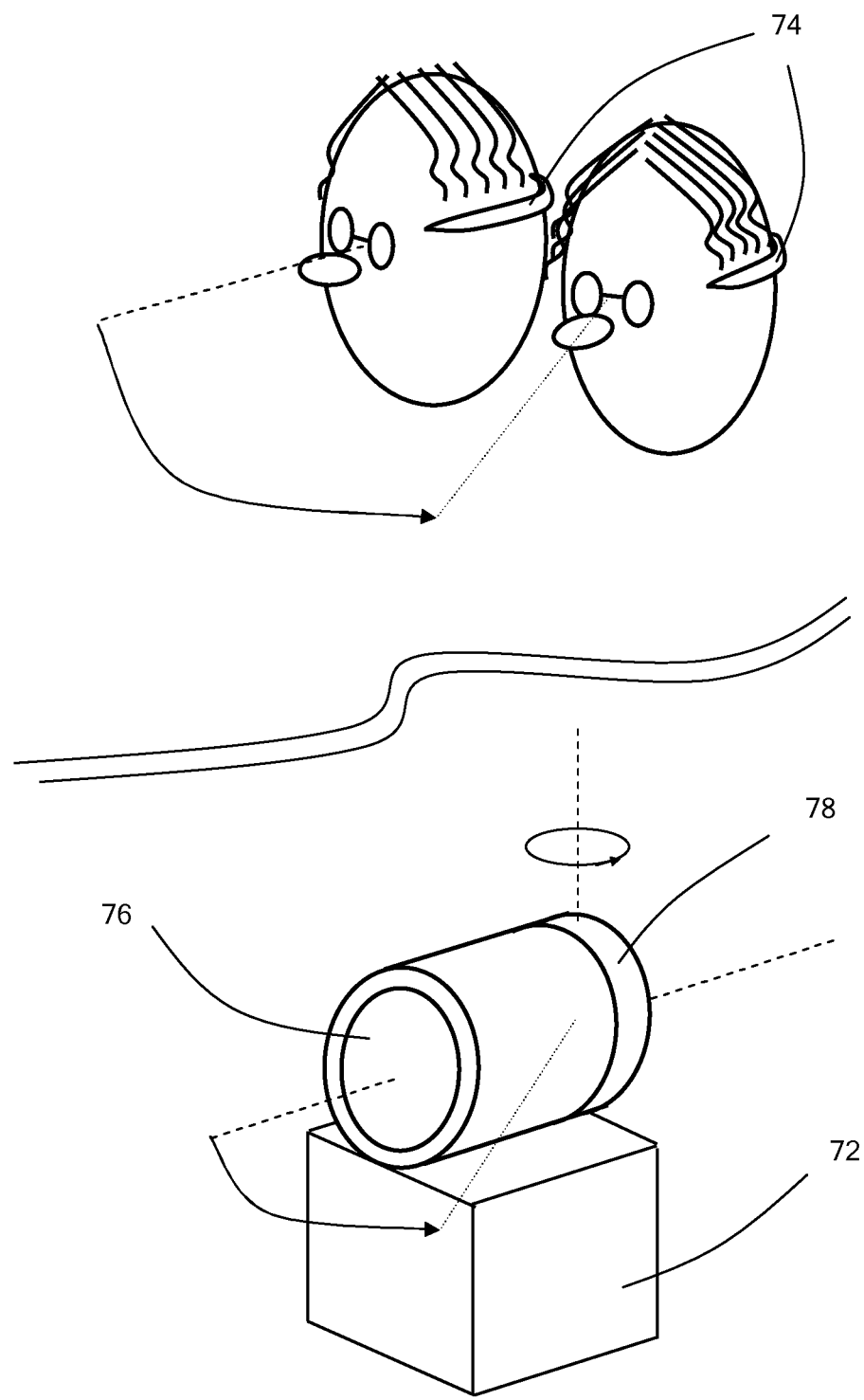
FIG. 11 is a perspective view of the camera showing the camera tracking the movement of the user's' head.

In an alternative embodiment, the body-mountable image capture device takes the form of a portable communication device 50 (FIGS. 8 and 9) having a radio antenna 52, loudspeaker 54 and microphone 56. The portable communication device is operable to allow the user to remotely communicate with one or more other parties and so functions as a body-mountable radio transceiver (e.g. a body-mountable walkie-talkie). The cover comprises a portion of the surface of the device body 58 such that when the cover is in the first position the cover and the surface of the device body form a continuous surface. When the cover is moved to the second position the cover and the surface of the device body are parted and the camera and LED are revealed between the cover and device body surface, the body-mountable image capture device begins to record images and the LED is activated. The cover has a ridge 60 which a user may push to move the cover from the first position to the second position.

In an alternative embodiment, the device body comprises a gimbal acting as an adjustable mounting. The gimbal comprises a hinged axis about which the gimbal and anything mounted upon the gimbal are free to rotate. The camera is mounted upon the gimbal and the gimbal is attached to the device body such that a change in orientation of the device body about the axis of the gimbal leaves the orientation of the camera unchanged. Therefore, if the gimbal axis is set horizontally then any change in orientation of the device body about that axis will leave the orientation of the camera horizontal.

The gimbal may further comprise an elongate lever extending perpendicularly from the gimbal's axis (acting as a graduation element). At least a portion of the elongate lever may pass through a viscous substance such as an oil, for example, such that the speed of the counter rotation of the gimbal about the gimbal's axis is damped. Therefore, the automatic adjustment gradually maintains the orientation of the camera.

The device body may comprise a second gimbal whose axis is set perpendicularly to that of the original gimbal. Accordingly, a change in orientation of the device body in any axis will not result in a change in the orientation of the camera.

Figure 12:
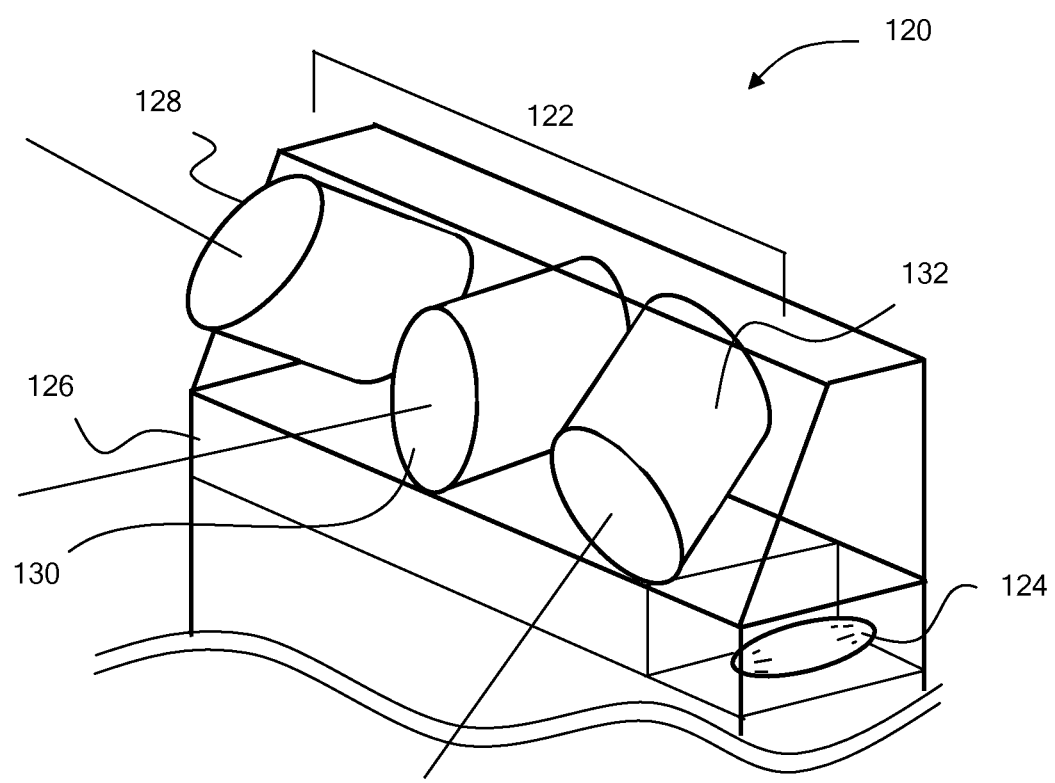
FIG. 12 is a perspective view of a further embodiment.

In an alternative embodiment (as depicted in FIG. 12) the body-mounted image capture device 120 comprises three cameras 122 (acting as a plurality of cameras) of fixed orientation relative to the body-mounted image capture device, a tilt sensor 124 and a processor 126 (acting as a selection module). Each camera is oriented at a unique angle. When the body-mounted image capture device is oriented vertically, the first camera 128 is oriented at 45 degrees above the horizontal, the second camera 130 is oriented horizontally and the third camera 132 is oriented 45 degrees below the horizontal.

The body-mounted image capture device further comprises a flash hard drive and an activation switch. The processor is electrically connected to the flash hard drive, the activation switch, the tilt sensor and the cameras.

During operation, the tilt sensor produces a tilt signal dependent on the orientation of the body-mounted image capture device. When the activation switch is operated, the processor receives activates one of the cameras determined by the tilt signal. The camera activated is generally that camera whose orientation most closely approximates horizontal when the body-mounted image capture device is in the vertical orientation indicated by the received tilt signal.

Second Example

With reference to FIGS. 6 and 7, 10 and 11, a body-mountable image capture device 70 comprises a device body 72 and a head-set 74, the device body comprising a camera 76, a piezoelectric mounting 78 and tilt sensor 80 (acting as an automatic adjustable mounting). The camera is adjustably mounted onto the device body via the piezoelectric mounting, and the tilt sensor is mounted onto the camera in such a way as to be operable to detect changes in the orientation of the camera with respect to the orientation of the device body in the vertical plane. The piezoelectric mounting connects the camera to the device body.

The piezoelectric mounting comprises a piezoelectric column 84 operable to be extended or retracted upon a change of electric current supplied to it, and an opposed sprung pivot 86.

The device body comprises a control unit 88. The control unit comprises a flash drive 90 (acting as storage media), a processor 92, an activation switch 94 and a wireless communication device 96 (acting as both a communication interface and a data receiving interface). The wireless communication device may be a Bluetooth transceiver. The control unit is electrically connected to the camera, the piezoelectric mounting and the tilt switch.

The device body also comprises a replaceable battery 98 electrically connected to the control unit and a clasp 100 acting as attachment means.

The head-set is suitable to be worn on the user's head and comprises an accelerometer 102 (functioning as the position sensor) and a data relay 104. The position sensor is electrically connected to the data relay. The data relay is operable to relay data wirelessly from the position sensor to the wireless communication device of the device body. The data relay may be a Bluetooth transceiver.

In operation, the body-mountable image capture device is attached to the user's clothing by the clasp such that the orientation of the device body corresponds to that of the user.

The head-set is worn by the user on the head. When worn on the user's head, the position sensor is oriented such that the position of the user's head is detected by the position sensor.

The activation switch of the control unit is activated when the user requires images to be recorded. The camera captures images which are then processed and stored on the flash drive by the processor.

A subject of the recording may begin within the field of view of the camera. However, the subject may move relative to the user and leave the field of view of the camera. When this happens the user will generally change the orientation of their head to remain looking at the subject.

The position sensor of the head-set detects the change in position of the user's head. The data relay transmits the data from the position sensor to the wireless communication interface of the control unit. The processor calculates the sense and magnitude of the change in position and automatically adjusts the horizontal orientation of the camera such that the field of view of the camera corresponds at least in part to that of the user. Thus, the centre of the field of view of the camera tracks changes of position of the wearer's head and so, when the wearer is looking directly at a subject, the subject is retained within the field of view of the camera.

In alternative embodiments, the position sensor and data relay may be mounted within a hat, head-band or helmet.

In an alternative embodiment, the device may comprise a trim control and the user may apply an offset to the orientation of the camera via the trim control in the same way as described in the first example.

One skilled in the art will appreciate that instead of a piezoelectric mounting other automatic actuators may be employed, for example, one or more servo motors.

Further variations and modifications may be made within the scope of the invention herein disclosed.

The invention claimed is:

1. A body-mountable image capture device comprising a device body and a cover slidably mounted onto the device body, the device body comprising a camera, wherein the cover is operable to slide between a first position and a second position such that in the first position the camera is concealed by the cover and in the second position the camera is exposed;
   wherein the orientation of the camera is automatically adjusted with respect to the orientation of the device body when the cover is in the second position such as to maintain the orientation of the camera in at least one plane; and
   wherein the orientation of the camera is adjusted with respect to that of the device body when the cover is in the second position such as to maintain the orientation of the camera.

2. A body-mountable image capture device according to claim 1, wherein the camera continuously captures images when the cover is in the second position.

3. A body-mountable image capture device according to claim 1, wherein the device body comprises a visual warning located on the device body such that it is concealed when the cover is in the first position and exposed when the camera is in the second position.

4. A body-mountable image capture device according to claim 1, wherein the orientation of the camera is adjustable with respect to that of the device body in a vertical plane.

5. A body-mountable image capture device according to claim 1, wherein the orientation of the camera is adjustable with respect to that of the device body in the horizontal plane.

6. A body-mountable image capture device according to claim 1, wherein the orientation of the camera is automatically adjustable with respect to that of the device body in a vertical plane when the cover is in the second position.

7. A body-mountable image capture device according to claim 6, wherein the orientation of the camera is automatically adjusted such as to maintain the orientation of the camera horizontally.

8. A body-mountable image capture device according to claim 6, wherein the orientation of the camera is adjustable both manually and automatically with respect to that of the device body such that the orientation of the camera is manually determined by the user and then automatically maintained.

9. A body-mountable image capture device according to claim 1, wherein the body-mountable image capture device further comprises an adjustable mounting by which the camera is mounted to the device body operable to allow the orientation of the camera to be adjusted relative to that of the device body.

10. A body-mountable image capture device according to claim 1, wherein the body-mountable image capture device comprises a position sensor attachable to a user's head remotely connected to the device body, the position sensor is operable to detect the position of the user's head, and the orientation of the camera is automatically adjusted to track the position of the user's head.

11. A body-mountable image capture device according to claim 10, wherein the body-mountable image capture device further comprises an adjustable mounting by which the camera is mounted to the device body operable to allow the orientation of the camera to be adjusted relative to that of the device body.

12. A body-mountable image capture device according to claim 1, wherein the cover comprises a manually operable formation, the manually operable formation being operable to assist a user to move the cover between the first and second positions.

13. A body-mountable image capture device according to claim 1, further comprising a radio transceiver.

14. A body-mountable image capture device according to claim 1, wherein the body-mountable image capture device further comprises attachment means for attaching the body-mountable image capture device to a user.

15. A body-mountable image capture device according to claim 14, wherein the attachment means comprises apertures operable to receive lanyard clips.

16. A body-mountable image capture device according to claim 1, wherein the body-mountable image capture device further comprises a communication device operable to transmit images stored on the storage media to an external device.

* * * * *